United States Patent Office 3,501,437
Patented Mar. 17, 1970

3,501,437
PVC COMPOSITIONS CONTAINING BENZO-THIAZOLINE LIGHT STABILIZERS
Matthew Peter DiGiaimo, Old Bridge, N.J., assignor to American Cyanamid Company, Stamford, Conn., a corporation of Connecticut
No Drawing. Filed June 20, 1967, Ser. No. 647,319
Int. Cl. C08f 45/60
U.S. Cl. 260—45.8                                 4 Claims

ABSTRACT OF THE DISCLOSURE

Rigid vinyl chloride polymers and copolymers are stabilized against the degrading effects of ultraviolet light with compounds represented by the following formula:

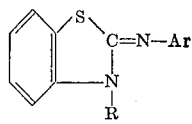

2-Aryliminobenzothiazolines wherein R is hydrogen or alkyl and Ar is an aryl group (e.g., phenyl or naphthyl). The aryl group can be unsubstituted or else substituted with a lower-alkoxy group and/or a lower-alkyl group in a position ortho and/or para to the point of attachment of the 2-amino or 2-imino group of Formula I or Formula II.

BACKGROUND OF THE INVENTION

Field of invention

The sensitivity to light and heat of both flexible and rigid poly(vinyl chloride) compositions has been recognized and, to some extent, dealt with, by incorporating in the polymeric composition to be stabilized, effective amounts of heat and light stabilizers. For convenience, "poly(vinyl chloride)" will be referred to throughout the specification as "PVC." As used herein, the expression "rigid" PVC is intended to mean a vinyl chloride polymeric composition having no plasticizer. "Rigid" PVC is to be distinguished from "flexible" PVC which is PVC containing a significant amount of plasticizer. "PVC" is inclusive of polymers of vinyl chloride and copolymers of vinyl chloride with minor amounts of other polymerizable vinyl monomers such as vinylidine chloride, vinyl fluoride, vinyl acetate, vinyl propionate, vinyl pyridine, vinyl imidazole, vinyl alcohol, acrylonitrile, methylacrylonitrile and the like.

Many polymeric compositions exhibit poor stability when exposed to ultraviolet light. PVC and polystyrene are particularly sensitive to color degradation and depolymerization by ultraviolet light.

There are available at the present time a great many light stabilizers for polymeric compositions, each of which is adaptable for use in one or more types of polymeric compositions. A particular light stabilizer may be effective for use in some polymeric compositions while being relatively useless for other polymeric compositions. It therefore is difficult to predict with reasonable accuracy the usefulness of a given light stabilizer for a given polymeric composition by observing the effects of the stabilizer in a different class of polymeric compositions. It is even difficult to predict the results for a rigid polymeric composition from the results obtained from the corresponding flexible polymeric composition.

Description of the prior art

At the present time, commonly employed light stabilizers for PVC include derivatives of benzophenones and benzotriazoles.

Although remote from the PVC art, U.S. Patent 2,393,801 discloses the use of 3-ethyl 2-phenyliminobenzothiazoline as a light stabilizer for polymeric cellulose organic acid esters, particularly cellulose acetate-butyrate. As will be more fully explained hereinafter, the results obtained for PVC with the class of light stabilizers, of which 3-ethyl 2-phenyliminobenzothiazoline is a member, is wholly unexpected.

SUMMARY OF THE INVENTION

Accordingly, the present invention provides PVC compositions which are stabilized against the degradating effects of ultraviolet light by incorporating therein compounds represented by the formula:

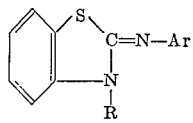

2-Aryliminobenzothiazolines wherein R is hydrogen or alkyl of 1–12 carbon atoms and Ar is an aryl group of less than three six-membered carbocyclic rings (e.g., phenyl or naphthyl). The aryl group can be unsubstituted or substituted with a lower-alkoxy group and/or a lower-alkyl group in a position ortho and/or para to the point of attachment of the 2-imino group.

The light-stabilized PVC compositions of this invention can be molded as solid sheets or shapes or employed in a vehicle for use as protective coatings as sheets or films. In addition, the PVC composition of the present invention can be employed to protect substrates which themselves are subject to ultraviolet light degradation as well as ultraviolet light sensitive merchandise, print chemicals and the like.

The PVC composition of the present invention, in addition to containing the light stabilizers described above, can contain materials normally employed in vinyl polymeric compositions including fillers, and heat stabilizers, if desired. PVC is normally processed at elevated temperature during the course of forming it into shaped articles. High temperatures tend to discolor the material if heat stabilizer is not present during the shaping processes. If it is desired to prevent discoloration, a heat stabilizer should be added. If discoloration is not an important problem, the heat stabilizer can be dispensed with. The heat stabilizer which may be used in the PVC for the latter to be processible without discoloration due to high temperatures, can be any of the conventionally available types. In fact, commercial PVC is currently always processed in the presence of a heat stabilizer and the same types which have been previously used, are useful herein in normally effective amounts. Most heat stabilizers are organo-metallic compounds. However, inorganic compounds such as sodium carbonate are also useful. Among the heat stabilizing organo-metallic compounds are the organo-tin compounds (dibutyl tin diamaleate, dibutyl tin dilaurate, dibutyl tin thioglycolic acid octyl ester); the cadmium or barium salts (barium stearate, cadmium stearate, barium ricinoleate, cadmium ricinoleate, barium octylphenolate); and the organic hydrochlorophyl (acid acceptor) of the epoxy type (epoxidized soybean oil, methyl epoxystearates). A more complete listing of such heat stabilizers is disclosed in Chevassus et al., The Stabilization of Polyvinyl Chloride, Arnold Publ. Ltd., London (1963), pp. 343–374. It is sometimes desirable to employ in conjunction with the metallic heat stabilizer, an organic phosphite for the purpose of chelating any metal halide which is formed as a decomposition product of PVC.

DESCRIPTION OF SPECIFIC EMBODIMENTS

Representative of the light stabilizers which can be employed in the present invention are 3-ethyl-2-phenyliminothiazoline, 3-ethyl-2-(o-methoxyphenylimino)benzothiazoline, and 3-ethyl-2-(beta-naphthylimino)-benzothiazoline. Other compounds, especially those with lower-alkyl and lower-alkoxy radicals, are also useful.

The amount of light stabilizers employed is between about 0.1 and 2.0%, preferably between about 0.2 and 1.0% based upon the weight of the rigid PVC. Less than about 0.1% of the light stabilizer will not satisfactorily stabilize the PVC while more than about 2.0% light stabilizer does not improve results sufficiently to justify the additional expense thereof.

The light stabilizers can be incorporated by conventional milling and blending techniques.

The compounds used as light stabilizers in the practice of this invention may be readily prepared from either 2-chlorobenzothiazole or 2-mercaptobenzothiazole. The 2-chlorobenzothiazole or 2-mercaptobenzothiazole is reacted with an aryl amine such as aniline or N-alkylaniline, in which the alkyl group has 1 to 12 carbon atoms, or o-alkoxyaniline in which the alkoxy group has 1–12 carbon atoms such as ortho- and para-anisidine or ortho- and para-phenetidine. The desired reaction can be conveniently carried out at a temperature in the range of from about 50° C. to about 180° C. The resulting product is recovered by conventional crystallization and filtration techniques.

The light stabilizers may be formed by quaternizing and then heating with alkali to form the corresponding 3-alkyl-2-aryliminobenzothiazole. Quaternizing agents such as dimethyl sulfate, diethyl sulfate, dibutyl sulfate, methyl bromide, ethyl iodide, ethyl or methyl-p-toluenesulfonate and the like are suitable for this purpose. The desired reaction can be carried out at a temperature in the range of from about 40° C. and about 150° C. The resulting product is recovered by conventional crystallization and filtration techniques.

The following examples are intended to be illustrative of the present invention and are not intended to limit the same.

EXAMPLE 1

Preparation of 2-(o-methoxyanilino)benzothiazole

A mixture of 67.8 g. of 2-chlorobenzothiazole and 98.4 g. of o-anisidine is heated on a steam bath for 2 hours. The resulting semisolid mass is triturated and washed with water. The crude product obtained is recrystallized from ethyl alcohol and then from a 1:1 volume dioxane-heptane mixture. The 2-(o-methoxyanilino) benzothiazole obtained (27.4 g.) melts at 15–157° C.

EXAMPLE 2

Preparation of 2-(o-methoxyphenylimino)benzothiazoline

A mixture of the product of Example 1 and 48 g. of ethyl iodide is heated on the steam bath in a pressure bottle for 24 hours. The reaction mixture is cooled, triturated with acetone and filtered. The solid obtained is suspended in about 400 cc. of acetone and concentrated NH₄OH is added dropwise until solution occurs. Excess water is then added and the product which separates is collected, washed with water and recrystallized from alcohol. The product is obtained as colorless needles, M.P. 114–116° C.

EXAMPLE 3

Preparation of 3-ethyl-2-(p-methoxyphenylimino)benzothiazoline

The compound of the formula:

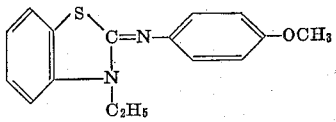

is prepared by sequentially employing the methods of Example 1 and Example 2 but employing p-anisidine rather than the o-anisidine used in Example 1. The product is obtained as a white solid having a melting point between 113° C. and 114° C.

EXAMPLE 4

Preparation of 2-(beta-naphthylamino)benzothiazole

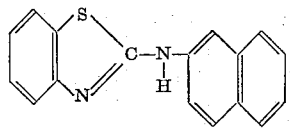

A solution of 57.2 g. of beta-naphthylamine and 34 g. of 2-chlorobenzothiazole in 300 cc. of toluene is refluxed for 68 hours. The resulting mixture is filtered hot and the residue triturated with three 500-cc. portions of hot toluene. The combined toluene filtrates are cooled and the solid which separates is collected. Recrystallization from benzene (Darco) gives a white product, M.P. 193–195° C.

EXAMPLE 5

Preparation of 3-ethyl-2-(beta-naphthylimino)benzothiazoline

A mixture of 20 g. of 2-(beta-naphthylamine)benzothiazole obtained as a product of Example 4, and 154.2 g. of ethyl iodide is heated on the steam bath in a pressure bottle for 20 hours. The mixture is cooled, and the lower liquid layer is decanted from the residue which remains. After trituration with hot acetone, the solid which forms is collected and recrystallized from ethanol.

The collected solid is suspended in acetone and treated with concentrated NH₄OH, dropwise, until complete solution occurs. The solution is mixed with excess water and cooled. The white solid that separates on standing is collected and recrystallized from alcohol. The product obtained melts at 79–80° C.

EXAMPLE 6

Light stabilizers illustrative of the generic class, are:

Light stabilizer
(1) 3-ethyl-2-(o-methoxyphenylimino)benzothiazoline
(2) 3-ethyl-2-(p-methoxyphenylimino)benzothiazoline
(3) 3-ethyl-2-phenyliminobenzothiazoline
(4) 3-ethyl-2-(beta-naphthylimino)benzothiazoline Absorption data for each light stabilizer giving its melting point, solvent for the stabilizer, the wavelength of maximum absorption and the absorptivity at that wavelength are as follows:

| Light stabilizer | M.P.,°C. | Solvent | $\lambda_{max}$, m$\mu$ | $a_{max}$ |
|---|---|---|---|---|
| 1 | 114–116 | Ethanol | 300 | 52 |
| 2 | 113–114 | do | 303 | 62 |
| 3 | 64–65 | Toluene | 305 | 62 |
| 4 | 79–80 | Ethanol | 308 | 64 |

EXAMPLE 7

To a solid, powdered or granulated uniform mixture of 100 parts rigid poly(vinyl chloride), 2 parts Thermolite 31 heat stabilizer and 0.5 part stearic acid is added a stabilizer in amounts shown in Table I. The percent is a measure of concentration based upon the weight of poly(vinyl chloride). The mixture is milled on a 2-roll mill for 5 minutes at 170° C. The resultant mixture is then compression-molded at 180° C. to give a 50-mil plaque.

A control plaque without the light stabilizer is prepared for comparison purposes.

Table I shows the results of exposing such plaques to a Fluorescent Sunlamp-Black Light unit (FS–BL unit) until a change of 15 units takes place in the Yellow Index. Yellow Index is a measure of the degree of yellowness determined from reflectance values obtained in a Colormaster differential colorimeter using the following formula:

$$YI = 70\left(1 - \frac{Blue}{Green}\right)$$

"Blue" and "Green" are reflectance readings on the instrument.

The longer it takes in hours to give a change of 15 YI units (i.e., for ΔYI=15), the better the compound is as a stabilizer. The results of such tests for the light stabilizers of this invention in rigid poly(vinyl chloride) are given in Table I, as follows:

TABLE I.—LIGHT STABILITY OF RIGID POLY(VINYL CHLORIDE)

| Light stabilizer | Conc., percent | Hours of exposure under FS-BL Unit for Δ YI=15 |
|---|---|---|
| Control | 0 | 117 |
| 3-ethyl-2-(o-methoxyphenylimino)-benzothiazoline | 0.25 | 430 |
| 3-ethyl-2-phenyliminobenzothiazoline | 0.25 | 465 |

EXAMPLE 8

Rigid poly(vinyl chloride) plaques prepared as in Example 7 were exposed in Florida sunshine. The amount of yellowing expressed in Yellow Index (YI) units is given in Table II. The smaller the number of units the less yellowing.

TABLE II

| Light stabilizer | Conc., percent | Increase in yellow index units | | |
|---|---|---|---|---|
| | | 2 mos. | 6 mos. | 9 mos. |
| Control | 0 | 2 | 18 | 49 |
| 3-ethyl-2-(o-methoxyphenylimino)benzothiazoline | 0.25 | 2 | 9 | 17 |
| 3-ethyl-2-phenyliminobenzothiazoline | 0.25 | 0 | 5 | 10 |

All the compositions having a light stabilizer show less yellowing than control at 6 and 9 months.

EXAMPLE 9

A rigid copolymer composition was prepared by compounding 100 parts of a copolymer prepared from 90% vinyl chloride and 10% vinyl acetate copolymerized, with 2 parts of Thermolite 31 heat stabilizer and 0.5 part of stearic acid. 100 parts of this vinyl copolymer is mixed with 0.20 part of the light stabilizer shown below, milled at 170° C. and molded at 180° C. into 50-mil plaques. Table III shows the results of testing with ultraviolet light as described in Example 7.

TABLE III

| Light stabilizer | Percent | Hours of exposure under FS-BL lamp for a 15 YI unit change |
|---|---|---|
| Control | 0 | 164 |
| 3-ethyl-2-phenyliminobenzothiazoline | 0.2 | 447 |

EXAMPLE 10

When the rigid PVC copolymeric sheets prepared in Example 7 are exposed in Florida sunshine, the following results are obtained.

TABLE IV

| Light stabilizer | Percent | Increase in yellow index units | |
|---|---|---|---|
| | | 3 Mos. | 5 Mos. |
| Control | 0 | 11 | 25 |
| 3-ethyl-2-phenyliminobenzothiazoline | 0.2 | 6 | 7 |

EXAMPLE 11

This example demonstrates the unobviousness of the light stabilized compositions of this invention. In Table V below are tabulated the results obtained when attempting to employ the light stabilizer used in this invention to stabilize polystyrene.

To a solid granulated mixture of 100 parts polystyrene is added a light stabilizer in amounts shown in Table V. The resultant mixture is milled for five minutes at 165° C. The resultant mixture was compression-molded to give a 50-mil plaque. A control plaque without light stabilizer is prepared for comparison purposes.

Each plaque is subjected to ultraviolet light in a Fade-Ometer with the results being obtained as shown in Table V.

TABLE V

| Light stabilizer | Wt. percent | Yellow index after "X" hours in FOM | | | |
|---|---|---|---|---|---|
| | | 0 | 200 | 400 | 600 |
| 3-ethyl-2-phenyliminobenzothiazoline | 0.25 | 6 | 9 | 15 | 27 |
| Control | 0 | 7 | 12 | 22 | 35 |

Only the slight improvement is obtained with 3-ethyl-2-phenyliminobenzothiazoline. These results are quite unlike the results obtained with PVC. In Example 9, and 3-ethyl-2-phenyliminobenzothiazoline provided more than twice the life for a given ΔYI than the control.

I claim:
1. Rigid poly(vinyl chloride) having an effective amount of a heat stabilizer and stabilized against the degrading effects of ultraviolet light by the presence therein of a light stabilizer represented by the formula:

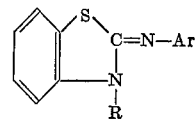

wherein R is hydrogen or alkyl of 1–12 carbon atoms and Ar is aryl of less than three six-membered carbocylic rings containing up to two substituents of the group consisting of lower-alkyl or lower-alkoxy, said stabilizer being present in an amount equal to 0.1 to 2.0 percent by weight of the vinyl chloride polymer.

2. The composition of claim 1 wherein the stabilizer is a 2-aryliminobenzothiazoline.

3. The composition of claim 1 wherein the light stabilizer is 3-ethyl - 2 - (o - methoxyphenylimino)benzothiazoline.

4. The composition of claim 1 wherein the light stabilizer is 3-ethyl - 2 - (p - methoxyphenylimino)benzothiazoline.

References Cited

UNITED STATES PATENTS

| 2,393,801 | 1/1946 | Morey et al. | 106—176 |
| 3,228,888 | 1/1966 | Spivack et al. | 252—402 |
| 3,297,708 | 1/1967 | Garber et al. | 260—306.7 |
| 3,391,106 | 7/1968 | Bloom et al. | 260—45.8 |

DONALD E. CZAJA, Primary Examiner

R. A. WHITE, Assistant Examiner

U.S. Cl. X.R.

260—23, 45.7, 45.75